Nov. 21, 1950     A. CAROSELLI ET AL     2,531,254
CAMERA MOUNTING APPARATUS
Filed June 4, 1948     2 Sheets-Sheet 1
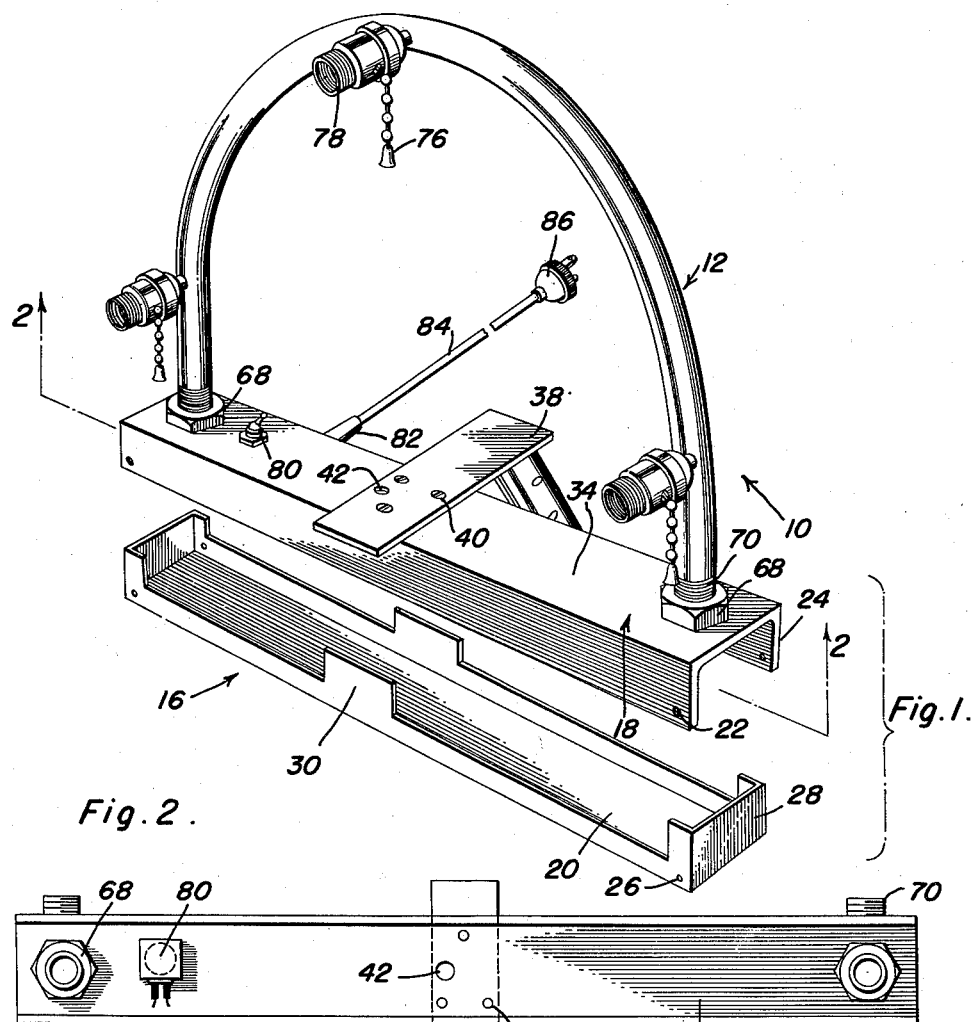
Alberico Caroselli
Dominick A. Caroselli
INVENTORS Nov. 21, 1950 A. CAROSELLI ET AL 2,531,254
CAMERA MOUNTING APPARATUS
Filed June 4, 1948 2 Sheets-Sheet 2
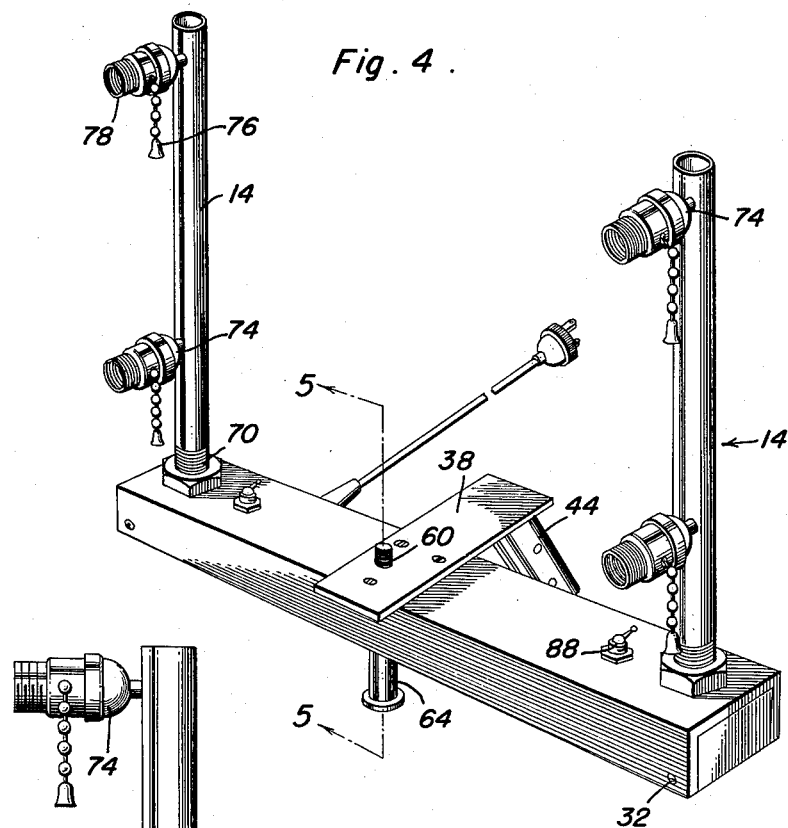
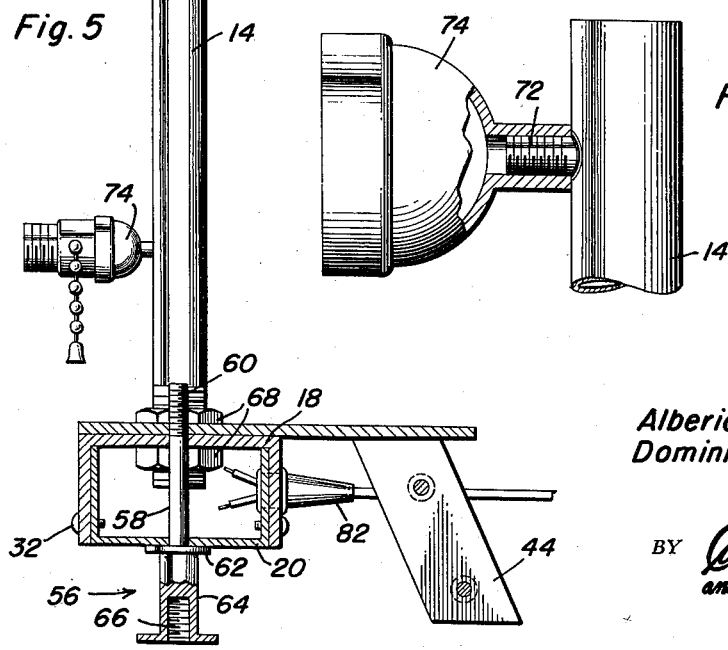
Alberico Caroselli
Dominick A. Caroselli
INVENTORS Patented Nov. 21, 1950

2,531,254

UNITED STATES PATENT OFFICE 2,531,254

CAMERA MOUNTING APPARATUS

Alberico Caroselli and Dominick A. Caroselli,
Jersey City, N. J.

Application June 4, 1948, Serial No. 31,198

2 Claims. (Cl. 248—177)

1

This invention relates to improvements in providing a support for cameras as well as light therefor, eliminating the necessity for the use of reflectors to obtain the maximum amount of light, or the provision of individual supports for such reflectors, the necessary light being available at all times in a unitary structure.

A primary object of the invention is to provide flood lights necessary for indoor photographs whereby the necessary light is obtainable from any desired angle to provide the maximum reflection on the subject, the lights being synchronized with the camera that is to take the photos.

Another object of the invention is to provide a base whereby the necessary electrical connections, as well as the elements needed to retain the camera and flood lights, is securely attached thereto with no exposed parts, thereby avoiding accidental damage to the equipment or injury to the person.

Still another object of the invention is to provide a unitary camera rest and carrying means whereby the pistol handle to facilitate the carrying about of the device is secured to a flat camera support, which in turn is secured to the base for unitary use of the invention.

A further object of the invention is to provide replaceable camera retaining means whereby the device is adapted to be mounted on a tripod when it is not to be held in the hand, generally due to the necessity for longer exposure of the subject being photographed, or a simplified retaining means when the camera is to be carried about.

A specific feature of the invention is in the provision of nipples attached to the standards receiving flood lamp holding sockets thereon and another specific feature of the invention is in the use of spool type adaptors for use with a tripod.

Other objects of the invention reside in the details of construction and in the combination of the various parts and in the mode of operation, as will hereinafter appear.

The following is a detailed description of a preferred embodiment of the invention, and is illustrated in the accompanying drawings, wherein:

Figure 1 is a perspective view of the invention, with the base shown in exploded relation;

Figure 2 is a bottom plan view of the invention and is taken substantially on the line 2—2 of Figure 1;

Figure 3 is a perspective view of one form of camera securing means;

Figure 4 is a perspective view of the invention and illustrating a modification thereof;

Figure 5 is a transverse vertical, sectional view taken substantially on the line 5—5 of Figure 4 and further illustrating a modification of the camera retaining means, and Figure 6 is an enlarged fragmentary view of the light securing means illustrated in section.

Referring to the figures, Figure 1 illustrates one form of the invention and is identified generally by the numeral 10 and includes an arcuate light support pipe or tube 12, while Figure 4 is similar to Figure 1, except that the lamp supporting means consists of a pair of tubular pipes or standards 14, in spaced parallel relation. Both pipes 12 and 14 are secured to a horizontal base 16, in a manner as will presently appear.

Base 16 consists of an upper member 18 and a lower member 20 receivable in member 18. Member 18 constitutes the support for the camera mounting and the lighting means and is constructed of an inverted U-shaped metal, such as aluminum or other metal alloys, or if desired, may be constructed of plastics. U-bar 18 is apertured at the opposite extremes 22 of the parallel depending legs 24 to retain therein in nested position member 20 similarly apertured at 26. Member 20 is trough-like in construction and includes vertical sides 28 at each extreme thereof, sides 28 being of a height substantially equal to the height of depending legs 24, so that it is able to assume the nested position illustrated in Figure 4 when joined to U-bar 18. A reinforcing and supporting flange 30 extends vertically at approximately the medial length of trough 20. Base 16 is held together in position by means of suitable screws 32 extending through apertures 26 and 22.

The depending legs 24 of upper base member 16 are joined transversely by a slot support member 34. Support 34 is apertured medially the longitudinal length thereof at a plurality of points 36, as may be readily seen in Figure 2, to mount securely thereon a short, flat bar 38, bar 38 being the means whereby a camera, not shown, is mounted and secured to the device. Suitable screws 40 retain bar 38 in position. Of course, it is understood that while a total of three apertures 36 have been illustrated, the number may be varied and will be governed by the ability of the total selected to perform the desired function. Bar 38 includes a somewhat larger aperture or opening 42, for receiving the camera retaining means, as will soon become apparent. Secured integrally to the bottom of bar 38, at the rear end thereof, is a sectional handle or pistol grip 44, for readily grasping the device and carrying it about. A thumb screw 46, extends through aperture 42 and consists of an elongated rod-like body 48 threaded at the upper extremity 50 thereof and a lower finger portion 52, separated from rod 48 by means of an annular flange or seat 54, seat 54 being adapted to rest against the bottom of trough 20 to limit further upward movement. As is apparent, the camera, containing a female threaded portion will be screwed on to threaded end 50 of thumb screw 46 to be held in position on support bar 38.

Thumb screw 46 is generally employed when the device is adapted to be used in a portable manner. However, in the event that the camera is to be mounted on a tripod or other stationary support, a different type of retaining means will be substituted. In that instance, a spool adapter 56, as is illustrated in Figures 4 and 5, is employed. Adapter 56 includes an elongated rod-like body or shank member 58 terminating in a threaded end 60. An annular flange 62, serving as a stop and retaining means is supplied in a manner similar to seat 54. A spool section 64, of somewhat larger diameter than shank 58 depends from flange 62 and is threadedly counter-bored at 66 for receiving the mounting screw of a tripod or other support. Thus, the invention is adapted to be employed either in a portable manner or in fixed position.

Base 16 is apertured at each extremity thereof on transverse support member 34 to receive on each side preferably hexagonally-shaped nuts 68, preferably of aluminum or other similar light weight and non-rusting material, nuts 68 being internally threaded to receive light supporting pipes 12 or 14. Referring specifically to the form of light support illustrated in Figure 1, it is readily apparent that pipe 12 is of arcuate shape, terminating at each extremity thereof in externally threaded ends 70 for retention in lock-nuts 68.

At several points along the arcuate surface of pipe 12, and where a total of three is illustrated, although the number may be varied to suit the requirements of the user, laterally extending nipples 72 are mounted in pipe 12 which has been suitably tapped to receive them. While a rigidly constructed nipple 72 is illustrated in Figure 6, nipple 72 being externally threaded to receive light mounting sockets 74, it is to be clearly understood that other types of nipples might be substituted, such as articulated nipples, where the light may be angularly shifted for proper focusing on the subject being photographed. Light sockets 74 are of conventional construction and are actuated by pull chain 76 in a manner well known. The other extremity thereof 78 is adapted to receive various sized light bulbs for reflecting purposes. A push button switch 80 is mounted on support 34 to control the operation of the lights. Thus, it is readily seen that this light control is at all times at a point convenient to the user of the device, whereby he is relieved of the necessity for returning to a fixed point of light control, generally located in the walls of a dwelling to operate the lights. Rubber insulating means 82 are mounted in the rear leg 24 or upper support member 18 to protect the wire lead 84 from the metallic construction of the device, lead 84 terminating in a suitable plug 86.

In the illustration disclosed in Figure 4, tubular pipes 14 have been substituted for arcuate pipes 12 and are of vertical construction. Standards 14 are supplied for each extremity of base 16 and are suitably tapped at any desired number of points, although one at each extremity of pipe 14 has been illustrated. The mounting of light socket 74 is similar to that employed for the modification of Figure 2. In this instance, if desired, a second push button switch 88 is supplied to control individually the upper and lower sets of lights.

The use of the invention is readily apparent. Both the camera retaining means and the lighting means are secured to the same support, whereby the photographer is able to employ the device in a portable manner, or in a stationary position when so desired. The invention is readily retained by means of the pistol grip construction and the operator is able to control the lighting thereof from the base itself. Thus, he is able to employ the invention outdoors or indoors with equal facility. The nested construction of base 16 encloses what would generally be exposed parts, thereby avoiding danger of injury to the person using the invention, or accidental injury to the component parts thereof.

The device will be suitably electrically connected in any well known manner. Nipple 72 permits direct projection of the desired light to the best possible advantage, and thereby increases the possibility of obtaining excellent photographs. Of course, it will be evident that the invention is suitable for many other uses, and is not restricted to merely mounting cameras for snapping pictures, but may be used to support a camera when pictures are to be projected upon a screen or the like, or in any other desired use thereof.

While a preferred embodiment of the invention has been shown and described, it is to be understood that various changes in size, shape and arrangement of parts may be made without departing from the spirit of the invention or the scope of the appended claims.

Having described the invention, what is claimed as new is:

1. In a photography support, an elongated base member, means for removably retaining a camera on said base member intermediate the ends of the latter, an arcuate standard, means for removably securing the free ends of said standard to said base member adjacent the ends of the latter, spaced nipples carried by said standard, and light retaining socket members removably carried by said nipples.

2. The combination of claim 1 wherein said camera retaining means includes a transverse bar carried by said base member intermediate the ends thereof and a rod extending through said base member and said bar, said rod including external threads at its upper end for engagement with an internally threaded socket member carried by a camera, and an annular flange on said rod at its lower end and adapted to abut said base member.

ALBERICO CAROSELLI.
DOMINICK A. CAROSELLI.

REFERENCES CITED

The following references are of record in the file of this patent:

UNITED STATES PATENTS

| Number | Name | Date |
| --- | --- | --- |
| D. 128,505 | Simpson | July 29, 1941 |
| D. 150,051 | Bensen | June 29, 1948 |
| 1,621,903 | Rossiter | Mar. 22, 1927 |
| 2,049,184 | Walsleben | July 28, 1936 |
| 2,418,067 | Carpenter, Sr. | Mar. 25, 1947 |
| 2,456,997 | Sachs | Dec. 21, 1948 |